United States Patent
Dickson et al.

(10) Patent No.: US 9,909,597 B2
(45) Date of Patent: Mar. 6, 2018

(54) SUPERSONIC COMPRESSOR WITH SEPARATOR

(71) Applicants: Bradford W. Dickson, Park City, UT (US); Harry Allan Kidd, Vero Beach, FL (US)

(72) Inventors: Bradford W. Dickson, Park City, UT (US); Harry Allan Kidd, Vero Beach, FL (US)

(73) Assignee: Dresser-Rand Company, Olean, NY (US)

( * ) Notice: Subject to any disclaimer, the term of this patent is extended or adjusted under 35 U.S.C. 154(b) by 611 days.

(21) Appl. No.: 14/509,294

(22) Filed: Oct. 8, 2014

(65) Prior Publication Data

US 2015/0104290 A1 Apr. 16, 2015

Related U.S. Application Data

(60) Provisional application No. 61/890,946, filed on Oct. 15, 2013.

(51) Int. Cl.

| | |
|---|---|
| *F04D 29/70* | (2006.01) |
| *F04D 29/22* | (2006.01) |
| *F04D 21/00* | (2006.01) |
| *F04D 17/10* | (2006.01) |
| *F04D 13/14* | (2006.01) |
| *F04D 13/12* | (2006.01) |
| *B01D 45/14* | (2006.01) |

(52) U.S. Cl.
CPC ........... *F04D 29/706* (2013.01); *F04D 17/10* (2013.01); *F04D 21/00* (2013.01); *F04D 29/2288* (2013.01); *B01D 45/14* (2013.01); *F04D 13/12* (2013.01); *F04D 13/14* (2013.01)

(58) Field of Classification Search
CPC ...... F04D 29/701; F04D 29/706; F04D 21/00; F04D 29/2288; F04D 13/12; F04D 13/14; B01D 45/14; F05B 2260/64
USPC .................................. 415/181, 169.2–169.4
See application file for complete search history.

(56) References Cited

U.S. PATENT DOCUMENTS

| | | | |
|---|---|---|---|
| 3,528,216 | A | 9/1970 | Garrett |
| 3,528,217 | A | 9/1970 | Garrett |
| 3,528,221 | A | 9/1970 | Garrett et al. |
| 4,905,481 | A | 3/1990 | Scaringe et al. |
| 5,123,811 | A | 6/1992 | Kuroiwa |
| 5,709,076 | A | 1/1998 | Lawlor |
| 5,832,715 | A | 11/1998 | Dev |

(Continued)

FOREIGN PATENT DOCUMENTS

| | | |
|---|---|---|
| CN | 102865141 A | 1/2013 |
| CN | 102865274 A | 1/2013 |

(Continued)

OTHER PUBLICATIONS

PCT/US14/59818—Notification of Transmittal of International Preliminary Report on Patentability, International Preliminary Report on Patentability, dated Sep. 14, 2015, 24 pages.

(Continued)

*Primary Examiner* — Christopher Verdier

(57) ABSTRACT

A fluid processing device may include a rotatable shaft, a driver configured to drive the rotatable shaft, a separator installed on the rotatable shaft, and a supersonic compressor fluidly communicating with the separator.

25 Claims, 9 Drawing Sheets

(56) References Cited

U.S. PATENT DOCUMENTS

| | | | |
|---|---|---|---|
| 6,019,825 A | 2/2000 | Greene et al. | |
| 6,171,074 B1 | 1/2001 | Charron | |
| 6,298,653 B1 | 10/2001 | Lawlor | |
| 6,434,924 B1 | 8/2002 | Lawlor | |
| 6,446,425 B1 | 9/2002 | Lawlor | |
| 6,694,743 B2 | 2/2004 | Lawlor et al. | |
| 6,776,825 B2 | 8/2004 | Betting et al. | |
| 7,003,961 B2 | 2/2006 | Kendrick et al. | |
| 7,241,392 B2 * | 7/2007 | Maier | B01D 17/0217 210/380.1 |
| 7,293,955 B2 | 11/2007 | Lawlor et al. | |
| 7,334,990 B2 | 2/2008 | Lawlor et al. | |
| 7,434,400 B2 | 10/2008 | Lawlor et al. | |
| 7,603,841 B2 | 10/2009 | Steele et al. | |
| 8,137,054 B2 | 3/2012 | Hofer et al. | |
| 8,152,439 B2 | 4/2012 | Lawlor | |
| 8,302,779 B2 * | 11/2012 | Maier | B01D 45/14 210/360.1 |
| 8,312,725 B2 | 11/2012 | Steele et al. | |
| 8,470,406 B2 | 6/2013 | Kobayashi et al. | |
| 8,500,391 B1 | 8/2013 | Lawlor | |
| 8,550,770 B2 | 10/2013 | Hofer et al. | |
| 8,657,571 B2 | 2/2014 | Hofer et al. | |
| 8,668,446 B2 | 3/2014 | Hofer et al. | |
| 8,770,929 B2 | 7/2014 | Hofer et al. | |
| 8,827,640 B2 | 9/2014 | Hofer et al. | |
| 8,864,454 B2 | 10/2014 | Hofer et al. | |
| 9,022,730 B2 | 5/2015 | Vysohlid et al. | |
| 9,097,258 B2 | 8/2015 | Hofer et al. | |
| 9,103,345 B2 | 8/2015 | Nagel et al. | |
| 2010/0236200 A1 * | 9/2010 | Saeed | B01D 45/04 55/306 |
| 2010/0329856 A1 * | 12/2010 | Hofer | F04D 21/00 415/181 |
| 2011/0017307 A1 | 1/2011 | Kidd et al. | |
| 2012/0005996 A1 * | 1/2012 | Lardy | B01D 45/06 55/317 |
| 2012/0088647 A1 | 4/2012 | Parkinson et al. | |
| 2012/0107106 A1 * | 5/2012 | Hofer | F04D 17/12 415/181 |
| 2013/0037657 A1 | 2/2013 | Breidenthal | |
| 2013/0039748 A1 | 2/2013 | Lawlor | |
| 2013/0142632 A1 | 6/2013 | Roberts, II et al. | |
| 2013/0160454 A1 | 6/2013 | Roberts, II et al. | |
| 2013/0164120 A1 | 6/2013 | Saretto et al. | |
| 2013/0164121 A1 | 6/2013 | Roberts, II et al. | |

FOREIGN PATENT DOCUMENTS

| | | |
|---|---|---|
| WO | 9827330 A1 | 6/1998 |
| WO | 2005008135 A2 | 1/2005 |
| WO | 2010128964 A1 | 11/2010 |
| WO | 2012054118 A1 | 4/2012 |
| WO | WO-2012/057885 A1 * | 5/2012 |
| WO | WO-2012/145486 A2 * | 10/2012 |

OTHER PUBLICATIONS

PCT/US2014/059818—Notification of Transmittal of the International Search Report and the Written Opinion of the International Searching Authority, or the Declaration, International Search Report, Written Opinion of the International Searching Authority, dated Jan. 23, 2015, 13 pages.

* cited by examiner

SUPERSONIC COMPRESSOR WITH SEPARATOR

CROSS REFERENCE TO RELATED APPLICATIONS

This application claims the benefit of U.S. Provisional patent application having Ser. No. 61/890,946, which was filed Oct. 15, 2013. The aforementioned patent application is hereby incorporated by reference in its entirety into the present application to the extent consistent with the present application.

BACKGROUND

A variety of devices for handling fluid streams, such as separators, compressors, and pumps, are known. Generally, a separator functions to separate a fluid stream into different phases, such as into liquid and gaseous portions, and/or may be used to remove solid matter from a fluid stream. Compressors and pumps basically function to compress or pressurize gases and pressurize liquids, respectively, often for the purpose of transporting the fluid, for example, within a pipeline. Typically, when a fluid stream is composed of both gaseous and liquid portions, the fluid stream must first be separated, and then the gaseous portions may be directed into a compressor, while the liquid portions may be directed into a pump so as to be separately treated. Such pumps generally include a rotary impeller powered by a driver or motor, and operate such that the fluid is accelerated by passing through the rotating impeller and then decelerated to increase the fluid pressure.

The separator and the compressor may be installed in a single casing, thereby providing an efficient, compact solution of compression system design. Such a system may be referred to as an integrated separator-compressor system. For the integrated separator-compressor system to be considered economical and commercially viable for use in onshore, offshore, and/or sub-sea applications, it is desirable that the number of stages of compression within the single casing be increased to increase the overall compressor pressure ratio within the single casing. However, current integrated separator-compressor systems face certain difficulties in satisfying this challenge. For example, increasing the number of stages of compression would increase the overall number of impellers required to achieve the desired compressor throughput (mass flow) and pressure rise. This would result in an increase in the length of the shaft and/or an increase in the distance between shaft bearings. An increased shaft length and bearing span would require an increased control of rotordynamics.

What is needed, therefore, is a compression system that provides an increased compression pressure ratio in a single casing in an economical and commercially viable manner.

SUMMARY

Exemplary embodiments of the disclosure may provide a fluid processing device. The fluid processing device may include a rotatable shaft, a driver configured to drive the rotatable shaft, a separator installed on the rotatable shaft, and a supersonic compressor fluidly communicating with the separator.

Exemplary embodiments of the disclosure may provide a method for processing multiphase fluid. The method may include separating at least one higher-density component and at least one lower-density component of the multiphase fluid using a separator, providing the separated at least one lower-density component to a supersonic compressor fluidly communicating with the separator, and compressing the at least one lower-density component to increase a pressure of the at least one lower-density component.

Exemplary embodiments of the disclosure may further provide a fluid processing device. The fluid processing device may include a rotatable shaft, a driver configured to drive the rotatable shaft, a supersonic compressor installed on the rotatable shaft, and a centrifugal compressor fluidly communicating with the supersonic compressor.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1A:
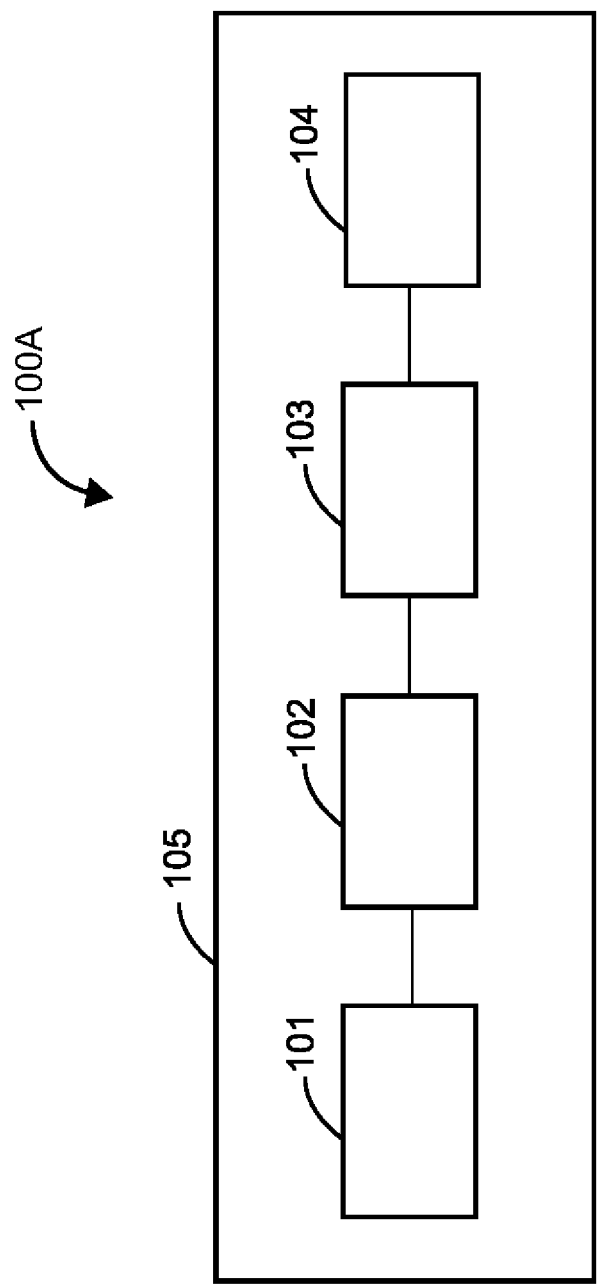
FIG. 1A illustrates a high level schematic view of an exemplary fluid processing device, according to one or more embodiments of the present disclosure.

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and the claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

Figure 1B:
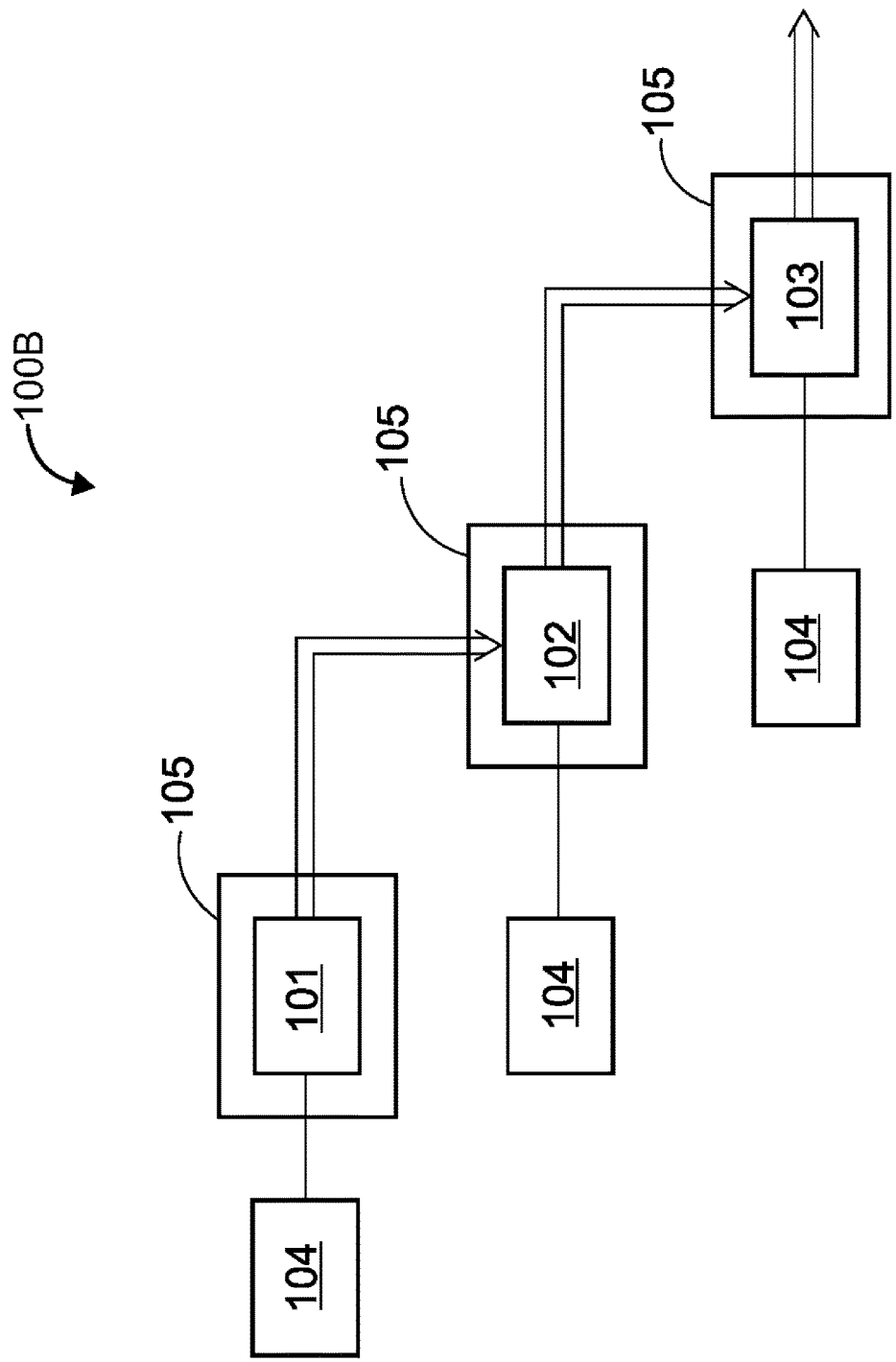
FIG. 1B illustrates a high level schematic view of another exemplary fluid processing device, according to one or more embodiments of the present disclosure.

FIG. 1A illustrates a high level schematic view of an exemplary fluid processing device 100A, according to one or more embodiments of the present disclosure. FIG. 1B illustrates a high level schematic view of another exemplary fluid processing device 100B, according to one or more embodiments of the present disclosure. FIG. 1B illustrates the same components as FIG. 1A, except that the components of FIG. 1B may be located on different shafts and in separate housings, as explained below. The exemplary fluid processing device 100A may include a separator 101 (rotary, static, or integrated rotary and static) which may be referred to as the first stage of the fluid processing device 100A. An output of the separator 101 may be connected to an input of a supersonic compressor 102, which may be referred to as the second stage of the fluid processing device 100A. The supersonic compressor 102 may be located on the same shaft as the separator 101 (FIG. 1A) or may be located on a different shaft (FIG. 1B). The output of the supersonic compressor 102 may be connected to a centrifugal compressor 103, which may be referred to as the third stage of the fluid processing device 100A. The centrifugal compressor 103 may be located on the same shaft as the separator 101 and the supersonic compressor 102 (FIG. 1A), or may be located on a different shaft (FIG. 1B). In an exemplary embodiment, the centrifugal compressor 103 may be disposed upstream of the supersonic compressor 102 and thus an output of the centrifugal compressor 103 may be connected to an input of the supersonic compressor 102. In another exemplary embodiment, the centrifugal compressor 103 may be omitted from the fluid processing devices 100A and/or 100B.

The fluid processing device 100A may also include a driver 104 (more than one driver may be present, e.g., in tandem) configured to drive the separator 101, the supersonic compressor 102, and/or the centrifugal compressor 103. The driver 104 may be coupled to the fluid processing device 100A at or adjacent the centrifugal compressor end thereof (e.g., downstream of the centrifugal compressor 103). Alternatively, the driver 104 may be coupled at or adjacent the supersonic compressor end (e.g., downstream of supersonic compressor 102 when the centrifugal compressor 103 is disposed upstream of the supersonic compressor 102 or when the centrifugal compressor 103 is absent) of the fluid processing device 100A. However, in an exemplary embodiment, the driver 104 may be coupled to the fluid processing device 100A at or adjacent the separator end thereof (e.g., upstream of the separator 101). In another exemplary embodiment, drivers 104 may be coupled to both ends of the fluid processing device 100A. For example, one driver 104 may be coupled at or adjacent the separator end of the fluid processing device 100A and another driver 104 may be coupled at or adjacent the centrifugal compressor end or the supersonic compressor end (when the centrifugal compressor 103 is disposed upstream of the supersonic compressor 102 or when the centrifugal compressor 103 is absent) of the fluid processing device 100A. In yet another exemplary embodiment, a double-ended driver 104 may be disposed between the components of the fluid processing device 100A and may drive the components of the fluid processing device 100A disposed on either side thereof.

In the exemplary embodiment illustrated in FIG. 1B, each component of the fluid processing device 100B may be coupled to an individual driver 104. The driver 104, the separator 101, the supersonic compressor 102, and/or the centrifugal compressor 103 may be installed on the same shaft (FIG. 1A). In another exemplary embodiment, the separator 101, the supersonic compressor 102, and/or the centrifugal compressor 103 may be provided with individual drivers 104 when these components are on different shafts (FIG. 1B).

The drivers 104 of the fluid processing devices 100A and 100B may drive the components of the fluid processing device 100A at the same rotational speed of the driver 104, i.e., without gear reduction, or the driver 104 may adjust the rotational speed of the components coupled thereto using gears or the like. Additionally, and depending on the desired application, each component of the fluid processing devices 100A and 100B may operate at a different speed. For example, in an exemplary application, the separator 101 may rotate at a lower speed compared to the centrifugal compressor 103. In another exemplary application, the supersonic compressor 102 may rotate at a speed greater than or equal to the speed of the centrifugal compressor 103.

The components of the fluid processing devices 100A and 100B may be enclosed (e.g., hermetically or non-hermetically) in a common housing 105 (FIG. 1A) or each component may be enclosed in an individual hermetically-sealed or non-hermetically sealed housing (FIG. 1B) or some (not all) components may be enclosed in a first hermetically-sealed or non-hermetically sealed housing while the other components may be enclosed in a second hermetically-sealed or non-hermetically sealed housing.

Figure 2:
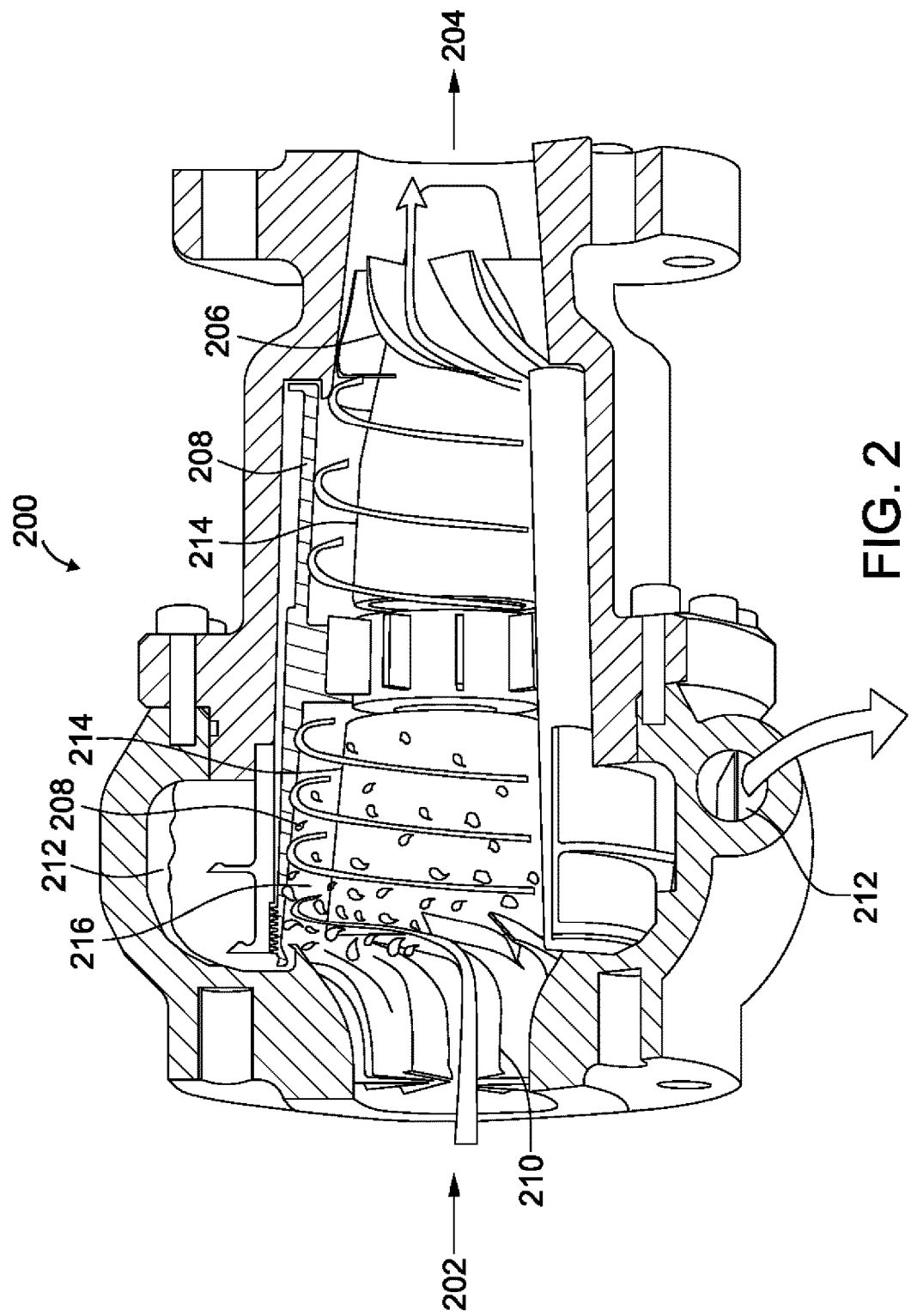
FIG. 2 illustrates a cross-sectional view of an exemplary rotary separator that may be used in the exemplary fluid processing devices of FIGS. 1A and 1B, according to one or more embodiments of the present disclosure.

FIG. 2 illustrates a cross-sectional view of an exemplary rotary separator 200 that may be used in the exemplary fluid processing devices 100A and 100B, according to one or more embodiments of the present disclosure. The exemplary rotary separator 200 may include a gas stream input 202 configured to receive a wet gas stream (e.g., the working fluid) and transmit the wet gas stream to a plurality of guide vanes or nozzles 210, wherein the guide vanes or nozzles 210 may be configured to impart a swirling motion to the wet gas stream as the wet gas stream enters the rotary separator 200. The interior of the rotary separator 200 may include a rotating drum 214 positioned within a separation chamber 216. The rotation of the rotating drum 214 may increase the swirling motion or circumferential velocity of the wet gas stream, and may cause the wet condensates in the wet gas stream to be centrifugally urged outward against an outer wall 208 of the separation chamber 216. The liquid condensates may be urged against the outer wall 208. The condensates may travel along the slope of the outer wall 208 and may be collected in an outer reservoir 212, where the liquid may be drained from the rotary separator 200. The dry gas stream may spin and/or swirl through the rotary separator 200 and may exit from the rotary separator 200 at an output 204 after passing through a second set of vanes or nozzles 206 that may be configured to diffuse/straighten the dry gas stream as it exits the rotary separator 200.

It should be noted that exemplary embodiments are not intended to be limited to the implementation of any particular rotary separator, and that various changes may be made to the rotary separator 200 without departing from the scope of the exemplary embodiments. In another exemplary embodiment, a rotary separator, such as the rotary separator described in commonly assigned U.S. Pat. No. 7,241,392 (hereafter, "the '392 patent") and U.S. Pat. No. 8,302,779 (hereafter, "the '779 patent") may be used in the exemplary fluid processing devices 100A and 100b. The contents of the '392 patent and the '779 patent are incorporated herein by reference in their entirety to the extent the disclosures of the '392 patent and the '779 patent are not inconsistent with the present disclosure.

Figure 3:
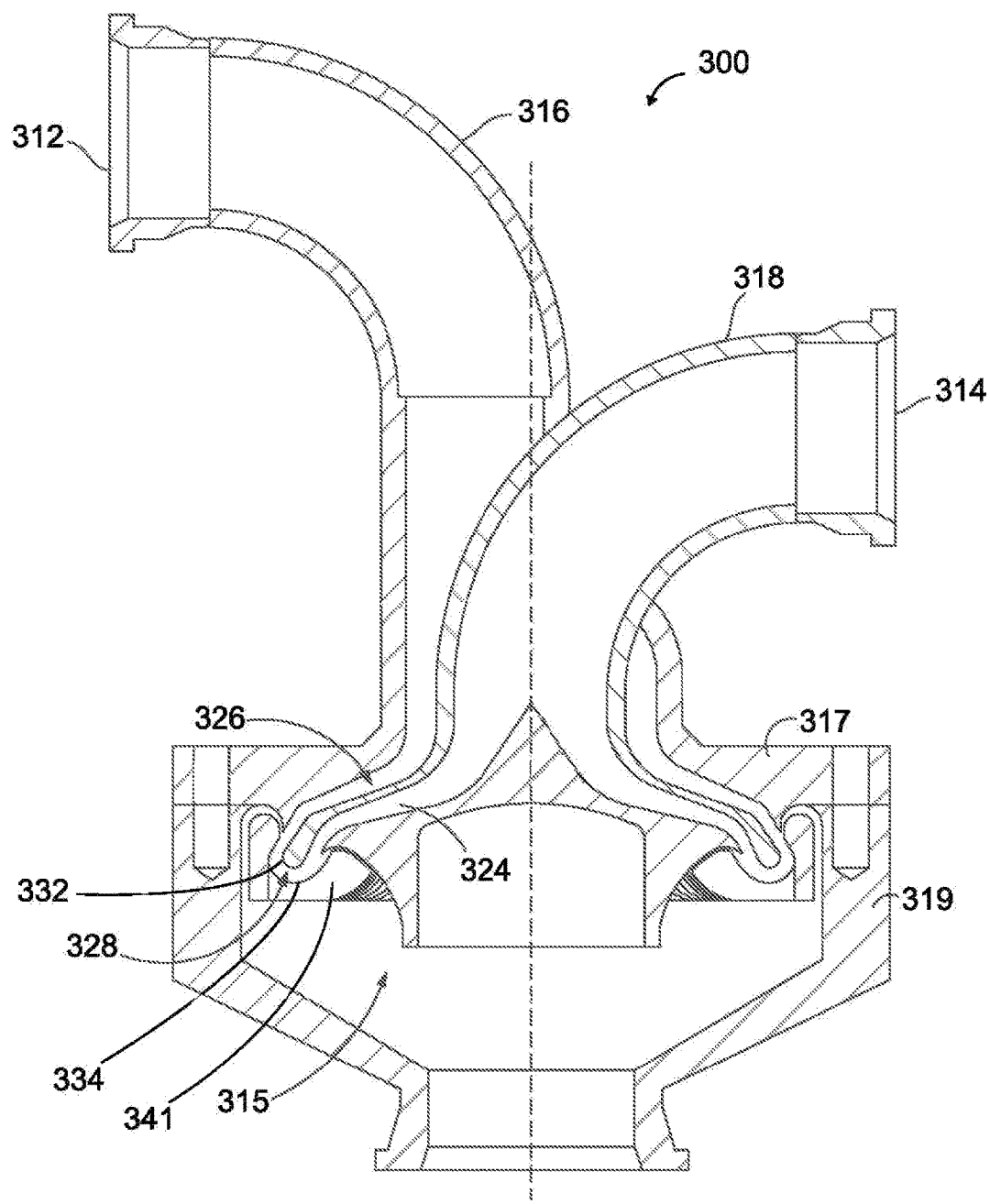
FIG. 3 illustrates a cross-sectional view of an exemplary static separator that may be used in the exemplary fluid processing devices of FIGS. 1A and 1B, according to one or more embodiments of the present disclosure.

FIG. 3 illustrates a cross-sectional view of an exemplary static separator 300 that may be used in the exemplary fluid processing devices 100A and 100b, according to one or more embodiments of the present disclosure. The exemplary static separator 300 may include a process fluid input 312, a process fluid output 314, and a liquid output 315. The process fluid input 312 may be connected to an external pipe (not shown) or other type of conduit that connects to a source of working fluid (not shown). The process fluid output 314 may be connected to another external pipe or, e.g., to a rotary separator (e.g., the input 202 of the rotary separator 200 described above) of the exemplary fluid processing devices 100A and 100b (not shown). In other exemplary embodiments, however, the process fluid output 314 may be connected to or be upstream from any other structures and/or devices. The process fluid input 312 may be fluidly connected to an input conduit 316, which may also be referred to herein as an input pipe, and the process fluid output 314 may be fluidly connected to an output conduit 318, which may also be referred to herein as an output pipe. It will be appreciated that the term "pipe" is not necessarily limited to a structure having a circular cross-section, and other cross-sections are contemplated herein.

In at least one exemplary embodiment, the input pipe 316 and the output pipe 318 may be removable and may include a top 317 attached to a base 319. Further, in at least one exemplary embodiment, the input pipe 316 and the output pipe 318 may be disposed such that a portion of the output pipe 318 may be located inside the input pipe 316, as shown. As also shown, the output pipe 318 may curve from vertical to horizontal, and may exit out of the input pipe 316 and connect to an external structure, as described above. The static separator 300 may include an output duct 324, an input duct 326, and a separating turn 328, which may together define a main flow path of the static separator 300.

The input pipe 316 may be fluidly connected to the input duct 326, as shown. The input duct 326 may be upstream from and may be fluidly connected to the separating turn 328. The separating turn 328 may be approximately a 180 degree turn. The separating turn 328 may be fluidly connected to the input duct 326 and the output duct 324. The separating turn 328 may include an inner surface 332 and an outer surface 334, with an outer body 341 of the static separator 300 providing the outer surface 334.

In an exemplary operation, a multiphase fluid (also referred to as a working fluid) may flow through the process fluid input 312 and into the input pipe 316. The multiphase fluid may be characterized by a higher-density component, which may be referred to herein as "liquid," and a lower-density component, which may be referred to herein as "gas," with it being desirable to separate the two components. It will be appreciated that, despite the naming convention chosen herein for the two components, the higher-density component may alternatively or, in addition, contain solids and/or relatively dense gases, and the lower-density component may alternatively or, in addition, include relatively light liquids and/or solids. Accordingly, the static separator 300 may separate any higher-density component (solid, liquid, and/or gas) from any lower-density component (solid, liquid, and/or gas).

The multiphase fluid may then flow into the input duct 326. The flow of multiphase fluid may then be directed through the separating turn 328, which may be a relatively sharp turn. The inertial force felt by the multiphase fluid flow in the separating turn 328 may be, for example, about 1800 times the force of gravity, which may be sufficient to separate out the liquid from the multiphase flow. It will be appreciated, however, that the static separator 300 may be designed such that other levels of inertial force may be attained. The inertial force may force the liquid toward the outer surface 334 of the separating turn 328, where it may then be expelled through the openings defined in the outer surface 334, through the outer body 341. Once expelled, the liquid may be channeled away from the separating turn 328 by the liquid output 315, using gravity or alternative means for draining the liquid.

As the liquid (and/or any other higher-density components of the flow) is centrifugally expelled, the gas is channeled through the separating turn 328 toward the output duct 324. After passing through the separating turn 328, the multiphase fluid may be made up of an increased percentage of gas and a reduced percentage of liquid, thus having an overall reduced density. The flow of multiphase fluid may then exit the static separator 300 via the output pipe 318, through the process fluid output 314 and, for example, to a rotary separator and/or a compressor. It should be noted that exemplary embodiments are not intended to be limited to the implementation of any particular static separator, and that various changes may be made to the static separator 300 without departing from the scope of the exemplary embodiments.

According to exemplary embodiments, a static separator may be attached to the rotary separator to handle higher volumes of multiphase fluid that may not be effectively separated by the rotary separator alone. The static separator may be positioned upstream of the rotary separator, e.g., in front of the rotary separator, immediately ahead of the input of the rotary separator and may be attached directly to the front end of the rotary separator. The static separator may significantly change the flow path direction which may be sufficient to cause coarse fluid separation. The output of the static separator may be in fluid communication with the input of the rotating separator.

Figure 4:
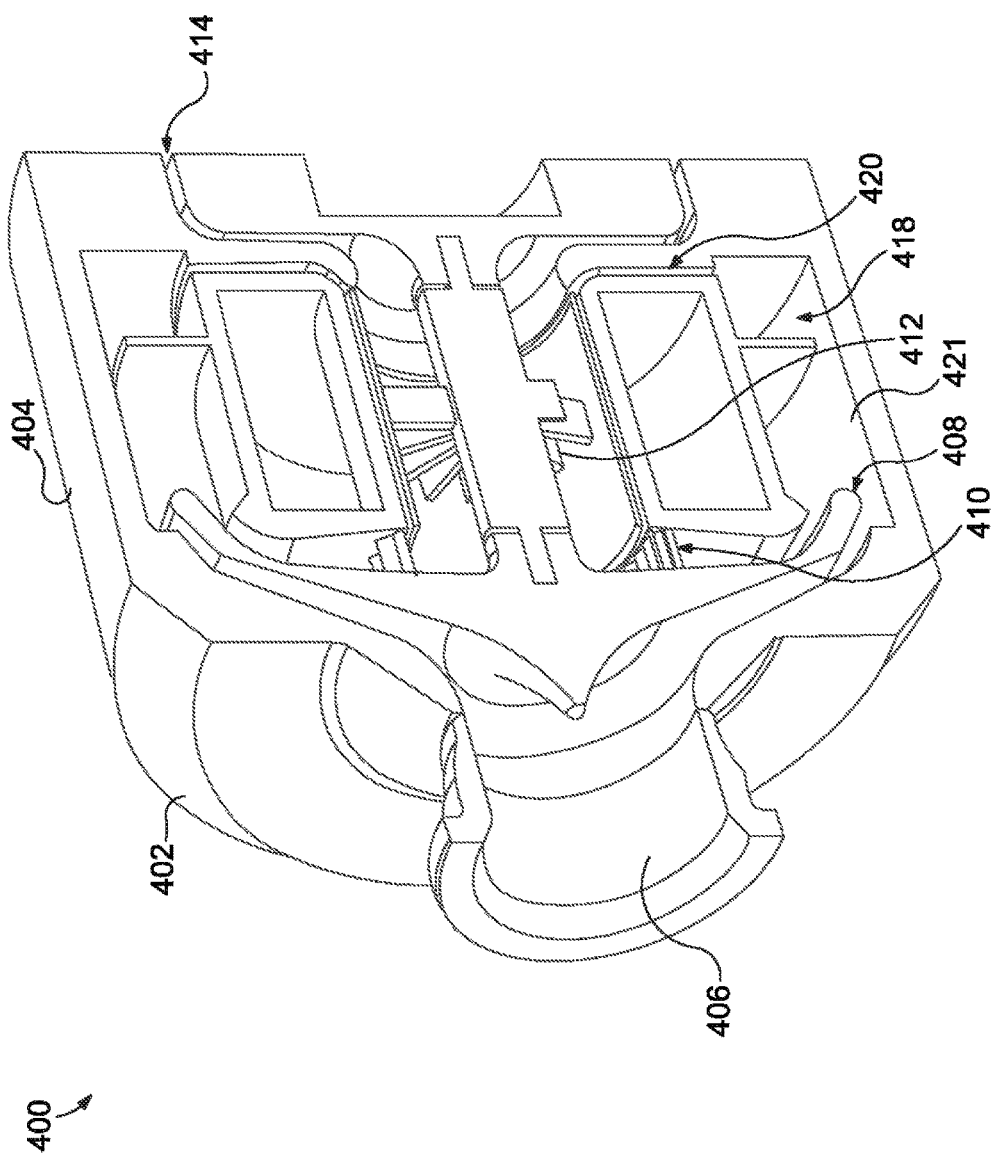
FIG. 4 illustrates a perspective, sectional view of an exemplary integrated static and rotary separator that may be used in the exemplary fluid processing devices of FIGS. 1A and 1B, according to one or more embodiments of the present disclosure.

FIG. 4 illustrates a perspective, sectional view of an exemplary integrated static and rotary separator 400 that may be used in the exemplary fluid processing devices 100A and 100B, according to one or more embodiments of the present disclosure. The integrated static and rotary separator 400 (or simply referred to as an integrated separator 400) may include a static separation section 402 and a rotating separation section 404, with the static separation section 402 being attached to the front (or input) end of the rotating separation section 404. For example, the static separation section 402 may be bolted directly to an input flange (not shown) of the rotating separation section 404.

By positioning a static separation section 402 upstream of a rotating separation section 404, the static separation section 402 may function to coarse-separate fluids from the incoming wet gas stream, with coarse-separation including removing a portion of the fluid from the stream (generally the higher-density fluids are removed by the static separation section 402). Thus, the gas stream entering the rotating separation section 404 may have less liquid mass to separate, and as such, the rotating separation section 404 may be able to more efficiently separate the remaining liquids from the incoming (already coarse-separated) stream. The end result of adding a static separation section 402 to a rotating separation section 404 is a substantial increase in the separation efficiency, as the rotating separation section 404 may not get bogged down with coarse separation and may be able to efficiently separate higher-density fluids from the incoming stream. It should be noted that the static separation section 402 may also be combined with the rotating separation section 404 in a common casing (without the bolting or other attachment limitation).

The static separation section 402 may include an input 406 configured to receive the incoming fluid stream (containing, e.g., liquids and gases therein) for separation. The fluid stream may enter the integrated separator 400 at the input 406 and may be directed radially-outward (away from a central axis of the separator 400) toward a separation turn 408. The fluid stream may be directed around the separation turn 408, and as a result of the centrifugal force, liquids may be coarsely separated from the fluid stream. The coarse separation may pull heavier fluids outward toward the outer wall of the separation turn 408, while the less dense gas, which may contain some liquids therein, may continue to travel radially-inward (toward the central axis of the integrated separator 400) through a conduit that connects the separation turn 408 to an input 410 of the rotating separation section 404. The coarsely separated fluid that may be separated by the separation turn 408 may be collected in a static separation chamber 421 and may be drained or otherwise removed therefrom as desired.

The separation turn 408 may form any angle sufficient to generate the centrifugal force required to separate the liquids in the incoming fluid stream. According to exemplary embodiments, the turning angle may be about 180°, between about 150 and 190°, between about 100° and about 130°, between about 125° and about 150°, or between about 100° and about 190°.

The fluid stream exiting the static separation section 402 may be directed to the input 410 of the rotating separation section 404. The rotary separator 412 may spin the gas stream via a driven separation drum to separate the remaining fluids from the gas stream. The output 414 of the rotating separation section 404 may then be communicated to a compressor (e.g., the supersonic compressor 102, above) for compression without significant liquid being contained in the gas to be compressed. Additionally, liquid separated from the fluid stream may be expelled via a fluid drain 420 of the rotating separation section 404 and may be collected in a rotary separation chamber 418, which may be in fluid communication with the static separation chamber 421. It should be noted that the exemplary embodiments are not intended to be limited to the implementation of any particular integrated rotary and static separator, and that various changes may be made to the integrated rotary and static separator illustrated herein without departing from the scope of the exemplary embodiments.

Figure 5:
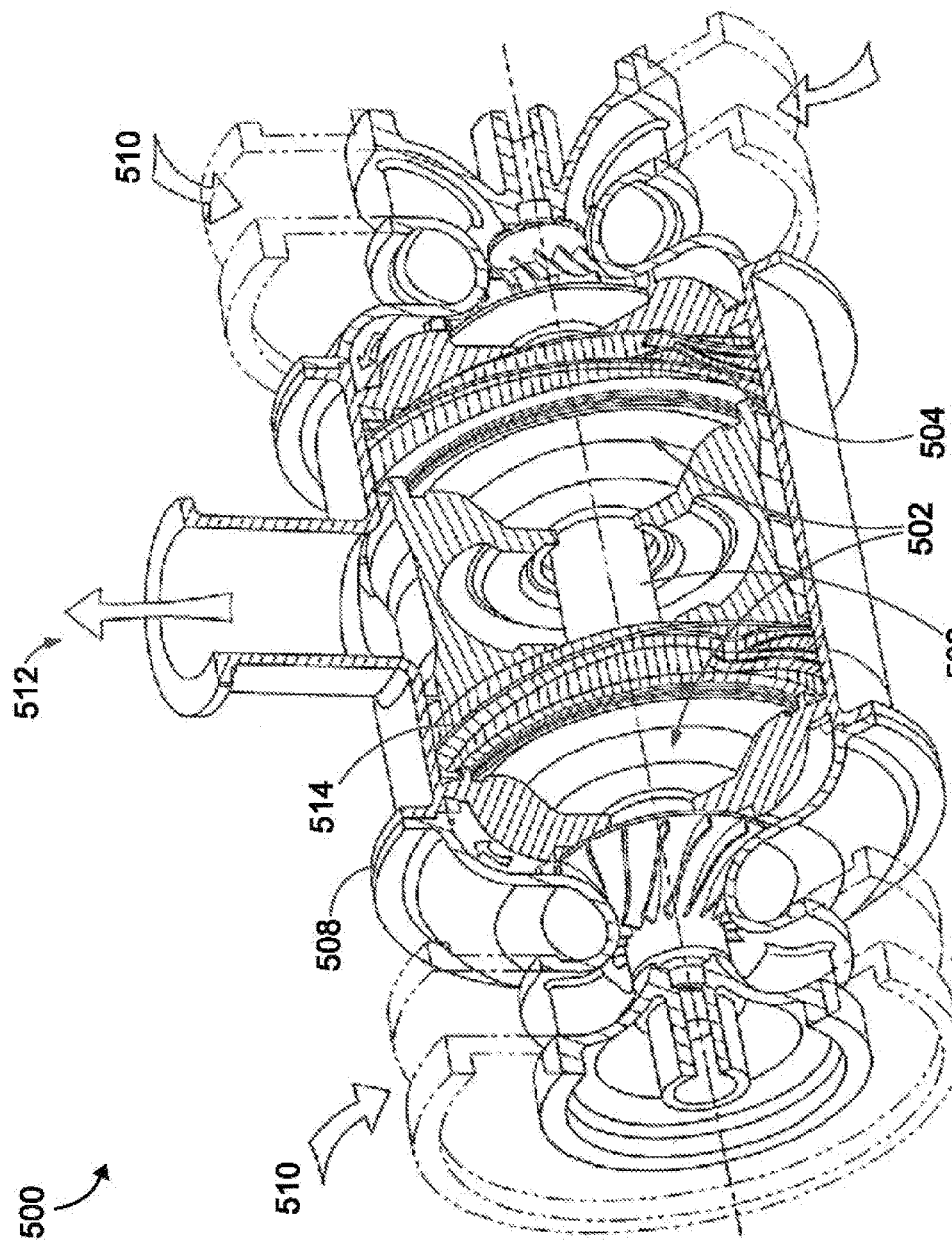
FIG. 5 illustrates a partially cut-away perspective view of an exemplary supersonic compressor that may be used in the exemplary fluid processing devices of FIGS. 1A and 1B, according to one or more embodiments of the present disclosure.

FIG. 5 illustrates a partially cut-away perspective view of an exemplary supersonic compressor 500 that may be used in the exemplary fluid processing devices 100A and 1006, according to one or more embodiments of the present disclosure. The exemplary supersonic compressor illustrated in FIG. 5 is also disclosed in U.S. Pat. No. 7,334,990, the entirety of which is incorporated herein by reference, to the extent not inconsistent with the present application. However, it should be noted that exemplary embodiments are not intended to be limited to the implementation of any particular supersonic compressor, and that various changes may be made to the supersonic compressor 500 without departing from the scope of the exemplary embodiments. For example, a supersonic compressor, as disclosed in U.S. Patent App. Pub. No. 2013/0164120 A1, the entirety of which is incorporated herein by reference to the extent not inconsistent with the present application, may be included in the exemplary fluid processing devices 100A and 1006, according to one or more embodiments of the present disclosure.

Returning to FIG. 5 for a more detailed description of the exemplary supersonic compressor 500, the supersonic compressor 500 may include two opposing wheels 502, where each wheel 502 may include an axial compression ramp 504 mounted in opposing fashion along a common shaft 506 for thrust balancing. The supersonic compressor 500 may also include a stationary housing or case 508 having inputs 510 for supply of low pressure gas (e.g., a lower-density component of a multiphase fluid provided to the separator) to be compressed, and a high-pressure compressed gas output nozzle or aperture 512. The opposing wheels 502 may have a central axis and may extend radially outward from the central axis toward an outer surface portion of the wheel. Each of the axial compression ramps 504, which may be on the outer portion or surface of the wheel 502, may form an inclined flow path feature extending outward from the outer surface portion of each of the wheels. Within the housing 508, a first circumferential stationary interior peripheral wall 514 may be provided radially outward from the wheel 502 and may be positioned very slightly radially outward from the outer extremity of the wheels 502. The stationary interior peripheral wall 514 includes an interior surface portion that may cooperate with the axial compression ramp 504 to contain and facilitate compression of a gas which may be directed between the compression ramp and the stationary interior peripheral wall 514.

Further, one or more helical strakes (upstream and downstream (not shown)) may be positioned adjacent the axial compression ramps 504, and an outwardly extending wall portion of the one or more helical strake may extend from the outer surface of the wheel 502. The upstream helical strakes and the downstream helical strakes may effectively separate the low pressure input gas from the high-pressure compressed gas that may be immediately downstream of each of the axial compression ramps 504. Downstream of each of the wheels 502 may be the high-pressure compressed gas output nozzle 512, where the high-pressure compressed gas may be communicated to another apparatus or device.

In an exemplary embodiment, an overhung supersonic compressor may be used in the exemplary fluid processing devices 100A and 100B. It should, however, be noted that when used, the separator 101 may be a static separator, and the static separator and the overhung supersonic compressor may be enclosed in a common housing.

Figure 6:
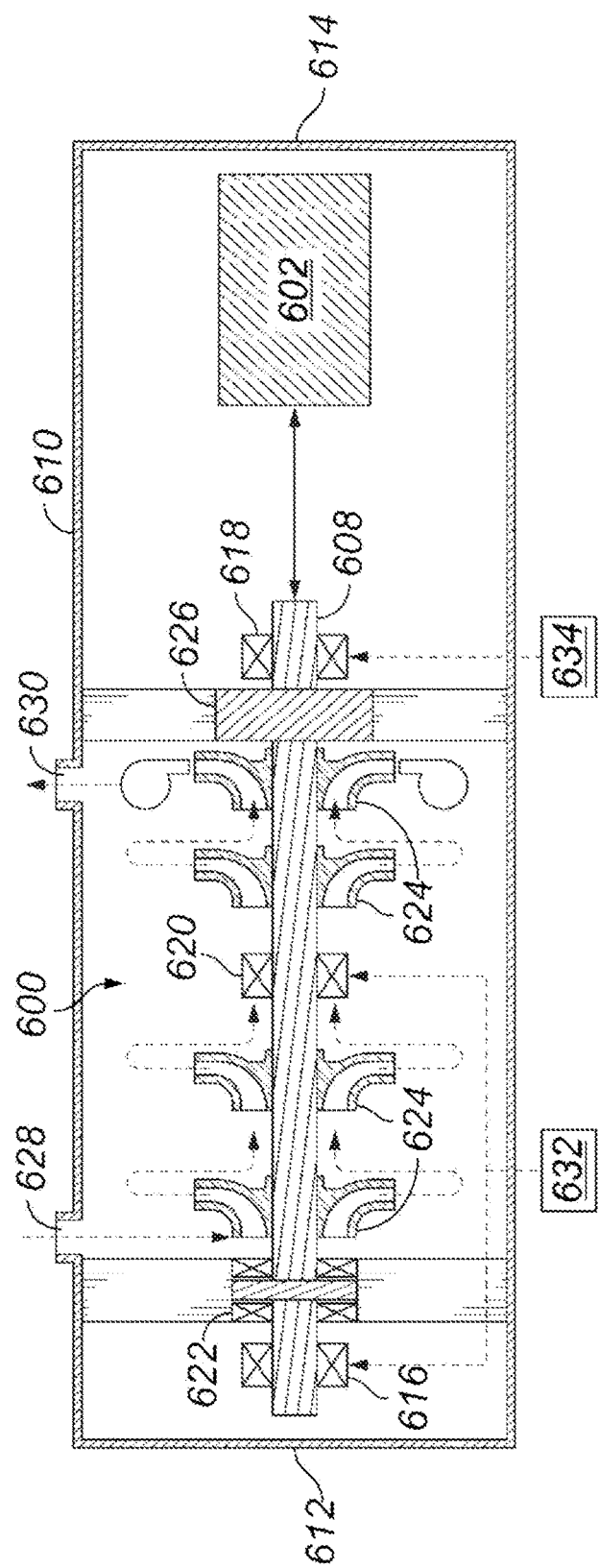
FIG. 6 illustrates a cross-sectional, schematic view of an exemplary centrifugal compressor that may be used in the exemplary fluid processing devices of FIGS. 1A and 1B, according to one or more embodiments of the present disclosure.

FIG. 6 illustrates a cross-sectional view of an exemplary centrifugal compressor 600 that may be used in the exemplary fluid processing devices 100A and 100B, according to one or more embodiments of the present disclosure. However, it should be noted that exemplary embodiments are not intended to be limited to the implementation of any particular centrifugal compressor, and that various changes may be made to the centrifugal compressor 600 without departing from the scope of the exemplary embodiments. The centrifugal compressor 600 may be enclosed in a housing 610, separate from the other components of the fluid processing device 100B (FIG. 1B), or may share a common housing with the other components of the fluid processing device 100A (FIG. 1A). In an exemplary embodiment using a static separator and an overhung supersonic compressor (see above), the centrifugal compressor 600 may be enclosed in a housing separate from the common housing enclosing the static separator and the overhung supersonic compressor.

Returning to FIG. 6, the housing 610 may have a first end, or compressor end 612, and a second end, or driver end 614. The centrifugal compressor 600 may be coupled to a driver 602 via a rotatable shaft 608 such that when the driver 602 operates, it drives the centrifugal compressor 600, at the same rotational speed of the driver 602, i.e., without gear reduction. Alternatively, the driver 602 may be configured to adjust the rotational speed of the centrifugal compressor 600 using gears or the like. The driver 602 may be an electric motor, but may also be any other type of driver typically used for rotating compressors.

The shaft 608 may be supported at or proximate each end, respectively, by at least one radial bearing, such as first and second radial bearings 616 and 618 (e.g., the first radial bearing 616 supports a first end of the shaft 608 and the second radial bearing 618 supports a second end of the shaft 608). Optionally, the shaft 608 may be further supported at an intermediate location between the first and second radial bearings 616, 618 by at least one intermediate radial bearing 620. Each radial bearing 616, 618, and 620 may be directly or indirectly supported by the housing 610 and may provide support for the centrifugal compressor 600 as the shaft 608 rotates during operation. Each radial bearing 616, 618, and 620 may be one of several different types of radial bearings without departing from the scope of the disclosure. For example, the radial bearings 616, 618, and 620 may be magnetic bearings, such as active or passive magnetic bearings, or may be other types of radial bearings, such as roller bearings or oil film bearings. In an exemplary embodiment, the radial bearings 616, 618, and 620 may be controlled either independently by separate channel sets 632, 634 in a bearing control system or jointly by a single set of channels in the bearing control system. By way of example, FIG. 6 depicts the first and intermediate radial bearings 616 and 620 as active magnetic bearings controlled jointly by the first set of channels 632 in the bearing control system, and the second radial bearing 618 as an active magnetic bearing controlled by the second set of channels 634 in the bearing control system.

In addition, at least one axial thrust bearing 622 may be provided at or near the end of the shaft 608 adjacent the compressor end 612 of the housing 610, and may be configured to bear axial thrusts generated by the centrifugal compressor 600. In one exemplary embodiment, the axial thrust bearing 622 may be an active magnetic bearing, a passive magnetic bearing, or other type of bearing suitable for rotordynamic damping in high speed turbomachinery.

The centrifugal compressor 600 may be a multi-stage centrifugal compressor having a plurality of, in this case four, compressor stage impellers 624 or wheels. However, any number of impellers 624 may be implemented or used in the centrifugal compressor 600, without departing from the scope of the disclosure. Further, a variety of impeller configurations are envisioned and the velocity of the working fluid exiting the impellers may be subsonic, supersonic, or transonic, without departing from the scope of the disclosure. A balance piston 626, including an accompanying balance piston seal (not shown), may be arranged on the shaft 608 between the driver 602 and the centrifugal compressor 600.

During operation, the driver 602 drives the shaft 608 and drives the centrifugal compressor 600. A process gas received from the supersonic compressor 102 may be introduced into the centrifugal compressor 600 via the input 628 (more than one input 628 may be present). The centrifugal compressor 600 may be configured to receive the substantially dry process gas from the supersonic compressor 102 and compress the dry process gas through the successive stages of impellers 624 and thereby produce a compressed process gas. The compressed process gas may then exit the centrifugal compressor 600 via an output 630 (more than one output 630 may be present).

In an exemplary embodiment, an overhung centrifugal compressor may be used in the exemplary fluid processing devices 100A and 100B in place of the center-hung centrifugal compressor described with reference to FIG. 6. It should, however, be noted that when used, the separator 101 may be a static separator. Herein, the static separator and the overhung centrifugal compressor may be enclosed in a common housing and the supersonic compressor may be enclosed in a separate housing. Alternatively, the static separator, the overhung centrifugal compressor, and the supersonic compressor may be enclosed in a common housing.

The driver 602 may be the driver 104 that may be used in the exemplary fluid processing devices 100A and 1006, according to one or more embodiments of the present disclosure. The driver 602 may be coupled to the centrifugal compressor end (e.g., downstream of the centrifugal compressor 600) of the fluid processing device 100A. However, in exemplary embodiments, the driver 602 may be coupled to the separator end (e.g., upstream of the separator 101) of the fluid processing device 100A. In an exemplary embodiment, more than one driver 602 may be coupled to the centrifugal compressor end and/or the separator end to drive the components of the fluid processing device 100A. For example, a second driver (not shown) may be coupled in series with the first driver 602 to work in cooperation with the first driver 602 and thereby provide more power and torque than could be achieved with the use of a single driver. However, it should be noted that exemplary embodiments are not intended to be limited to the implementation of any particular type of driver, and that various changes may be made to the driver 602 without departing from the scope of the exemplary embodiments. In another exemplary embodiment, each component of the fluid processing device 100B may be coupled to one or more drivers 104 (e.g., driver 602) located on one or both ends of the components. In yet another exemplary embodiment, a double-ended driver 104 may be disposed between the components of the fluid processing device 100A and may drive the components of the fluid processing device 100A disposed on either side thereof.

In an exemplary embodiment, the driver 602 may be external to the housing 610 (hermetically-sealed or non-hermetically sealed), without departing from the scope of the disclosure. In an exemplary embodiment, when the centrifugal compressor 103 is omitted from the fluid processing device 100A or when the centrifugal compressor 103 is disposed upstream of the supersonic compressor 102 (see above), one or more drivers 602 may be coupled to the supersonic compressor 102.

Figure 7:
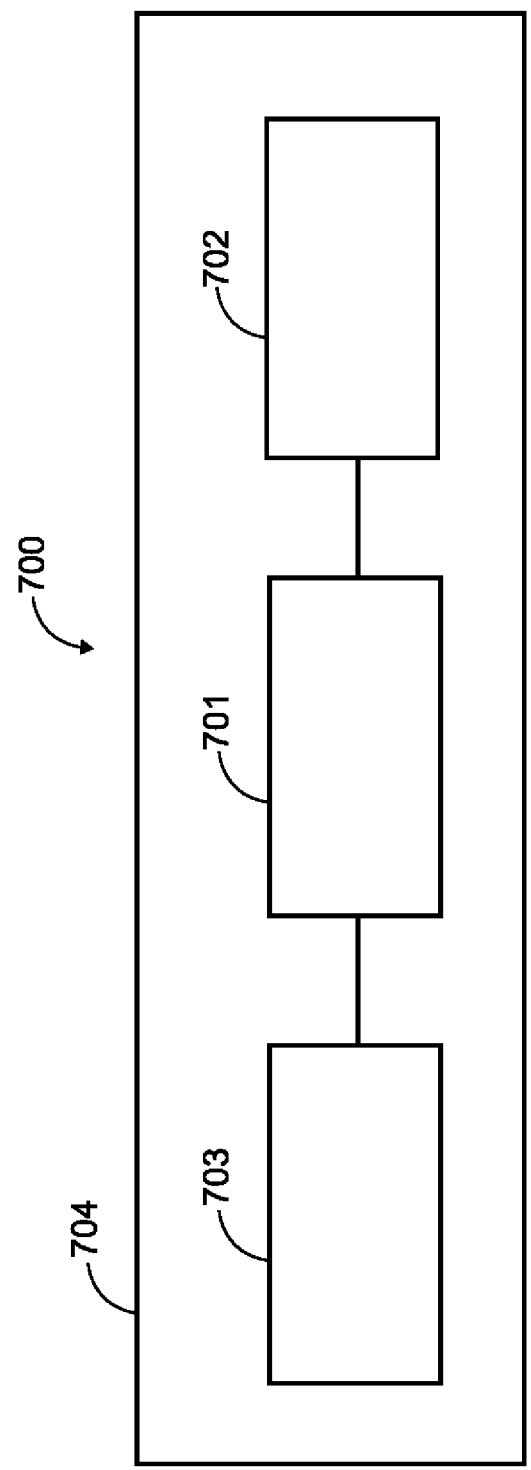
FIG. 7 illustrates a high level schematic view of another exemplary fluid processing device, according to one or more embodiments of the present disclosure.

FIG. 7 illustrates a high level schematic view of another exemplary fluid processing device 700, according to one or more embodiments of the present disclosure. The exemplary fluid processing device 700 may include a supersonic compressor 701, which may be referred to as the first stage of the fluid processing device 700. An output of the supersonic compressor 701 may be connected to an input of a centrifugal compressor 702, which may be referred to as the second stage of the fluid processing device 700. The supersonic compressor 701 may be located on the same shaft (e.g., as illustrated in the fluid processing device 100A of FIG. 1A) as the centrifugal compressor 702 or may be located on a separate shaft (e.g., as illustrated in the fluid processing device 100B of FIG. 1B). In another exemplary embodiment, the centrifugal compressor 702 may be located upstream of the supersonic compressor 701 and an output thereof may be connected to the input of the supersonic compressor 701.

The fluid processing device 700 may also include a driver 703 (more than one driver may be present, e.g., in tandem) configured to drive the supersonic compressor 701 and the centrifugal compressor 702. As illustrated, the driver 703 may be coupled to the fluid processing device 700 at or adjacent the supersonic compressor end thereof or the centrifugal compressor end of the fluid processing device 700 when the centrifugal compressor 702 is located upstream of the supersonic compressor 701. Alternatively, the driver 703 may be coupled at or adjacent the centrifugal compressor end of the fluid processing device 700 or the supersonic compressor end of the fluid processing device 700 when the centrifugal compressor 702 is located upstream of the supersonic compressor 701. In another exemplary embodiment, the driver 703 may be disposed between the supersonic compressor 701 and the centrifugal compressor 702.

The supersonic compressor 701, the centrifugal compressor 702, and/or the driver 703 may be installed on the same shaft. In another exemplary embodiment, the supersonic compressor 701 and the centrifugal compressor 702 may be driven by individual drivers when these components are on different shafts. The components of the fluid processing device 700 may be enclosed (e.g., hermetically or non-hermetically) in a common housing 704 or each component may be enclosed in an individual hermetically-sealed or non-hermetically sealed housing or some (not all) components may be enclosed in a first hermetically-sealed or non-hermetically sealed housing while the other components may be enclosed in a second hermetically-sealed or non-hermetically sealed housing.

According to an exemplary embodiment, the supersonic compressor 500 (e.g., center-hung) in FIG. 5 may be used as the supersonic compressor 701 in the exemplary fluid processing device 700. Alternatively, an overhung supersonic compressor may be used. However, it should be noted that exemplary embodiments disclosed are not intended to be limited to the implementation of any particular supersonic compressor, and that various changes may be made to the supersonic compressor 701 without departing from the scope of the exemplary embodiments.

According to an exemplary embodiment, the centrifugal compressor 600 (e.g., center-hung) in FIG. 6 may be used as the centrifugal compressor 702 in the exemplary fluid processing device 700. Alternatively, an overhung centrifugal compressor may be used. However, it should be noted that exemplary embodiments disclosed are not intended to be limited to the implementation of any particular centrifugal compressor, and that various changes may be made to the centrifugal compressor 702 without departing from the scope of the exemplary embodiments.

According to an exemplary embodiment, the driver 602 may be used as the driver 703 in the exemplary fluid processing device 700. It should be noted that the driver 703 may drive the components of the fluid processing device 700 at the rotational speed of the driver 703, i.e., without gear reduction, or may adjust the rotational speed of the components coupled thereto using gears or the like. Additionally, and depending on the desired application, each component of the fluid processing device 700 may be driven at a different speed. It should also be noted that exemplary embodiments disclosed are not intended to be limited to the implementation of any particular type of driver, and that various changes may be made to the driver 703 without departing from the scope of the exemplary embodiments.

Figure 8:
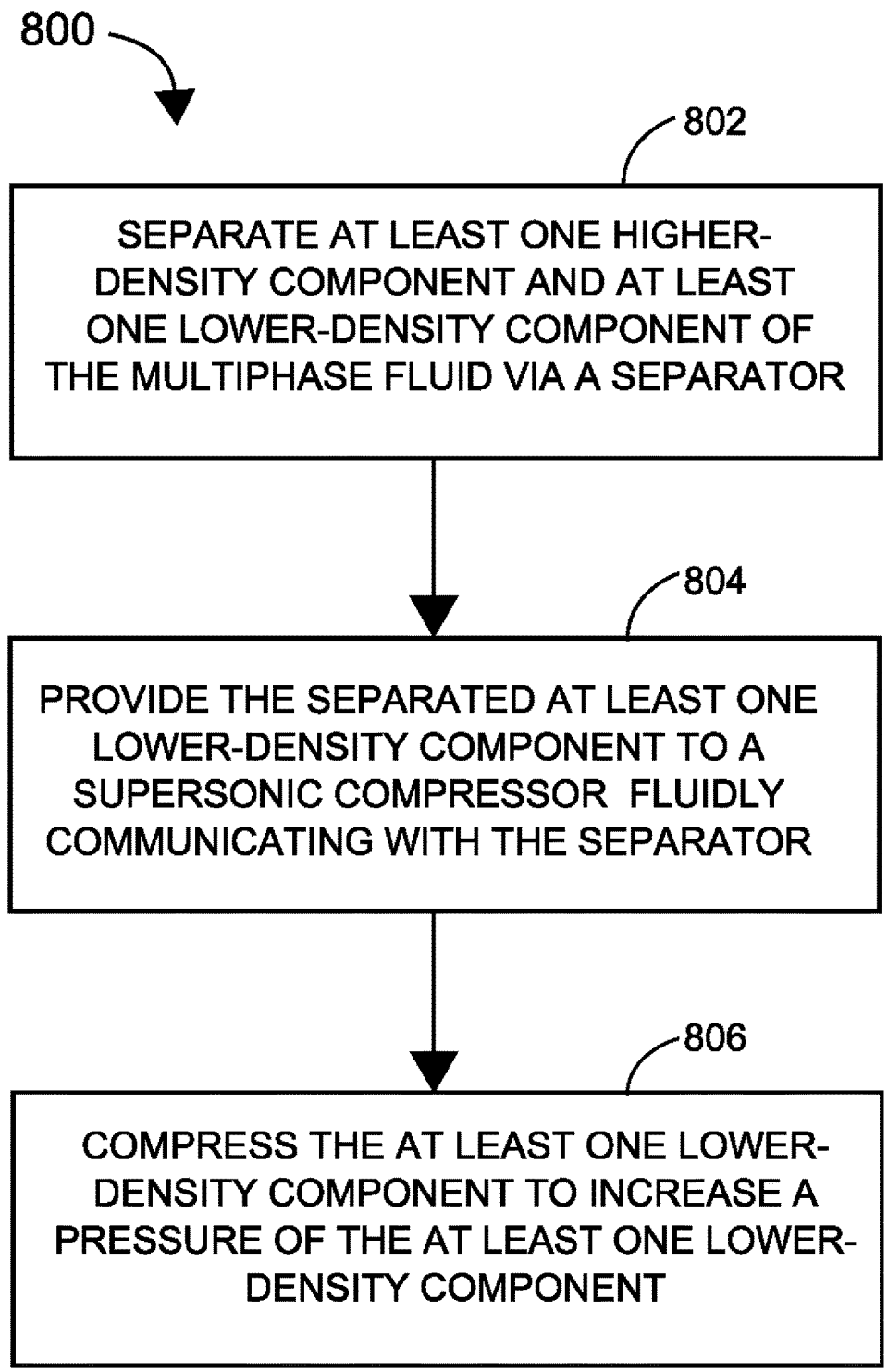
FIG. 8 is a flowchart of an exemplary method for processing multiphase fluid, according to one or more embodiments of the present disclosure.

FIG. 8 is a flowchart of an exemplary method 800 for processing multiphase fluid, according to one or more embodiments of the present disclosure. The method 800 may include separating at least one higher-density component and at least one lower-density component of the multiphase fluid via a separator, as shown at 802, providing the separated at least one lower-density component to a supersonic compressor fluidly communicating with the separator, as shown at 804, and compressing the at least one lower-density component to increase a pressure of the at least one lower-density component, as shown at 806.

According to exemplary embodiments, the fluid processing devices 100A, 100B, and 700 may have several configurations. For example, the fluid processing device 100A may be configured as:

1. a separator (rotary, static or both) and a supersonic compressor, in the same housing (e.g., unitary) or different housing;
2. a separator (rotary, static or both), a supersonic compressor and a centrifugal compressor, in the same (e.g., unitary) or different housing;
3. a supersonic compressor and a centrifugal compressor, in the same (e.g., unitary) or different housing; and
4. a supersonic compressor, a centrifugal compressor, and a driver, in the same (e.g., unitary) or different housing.

However, exemplary embodiments are not limited thereto and the fluid processing devices 100B and 700 may also be implemented based on similar configurations.

By combining the separator, the supersonic compressor, and/or the centrifugal compressor, process gas may be pressurized to level higher than the level achieved using the currently available integrated separator-compressor systems. The commercial advantage is derived from having fewer stages of compression, fewer casings, and/or shorter bearing span than current solutions for the same pressure ratio. The exemplary fluid processing devices may also result in a reduction of design and installation costs, reduction of compression solution footprint, and/or reduction of compression solution weight. As compared to the current integrated separator-compressor systems, the exemplary fluid processing devices may also offer advantages such as a reduced rotor length, an increased pressure rise per casing, an increased mass flow per case, and an increased efficiency.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

We claim:

1. A fluid processing device, comprising:
   a first rotatable shaft;
   a first driver configured to drive the first rotatable shaft;
   a separator installed on the first rotatable shaft; and
   a supersonic compressor installed on the first rotatable shaft and fluidly communicating with the separator.

2. The fluid processing device of claim 1, wherein an input of the supersonic compressor fluidly communicates with an output of the separator.

3. The fluid processing device of claim 2, further comprising:
   a centrifugal compressor installed on the first rotatable shaft, an output of the supersonic compressor being in fluid communication with an input of the centrifugal compressor.

4. The fluid processing device of claim 3, wherein the first driver is coupled to the first rotatable shaft at or adjacent a centrifugal compressor end of the fluid processing device.

5. The fluid processing device of claim 1, further comprising:
   a centrifugal compressor installed on the first rotatable shaft, wherein
      an output of the separator is in fluid communication with an input of the centrifugal compressor, and
      an output of the centrifugal compressor is in fluid communication with an input of the supersonic compressor.

6. The fluid processing device of claim 1, further comprising:
   a centrifugal compressor in fluid communication with the supersonic compressor.

7. The fluid processing device of claim 6, wherein the separator, the supersonic compressor, and the centrifugal compressor are enclosed in a unitary hermetically-sealed or non-hermetically sealed housing.

8. The fluid processing device of claim 6, wherein the separator, the supersonic compressor, and the centrifugal compressor are each enclosed in a separate hermetically-sealed or non-hermetically sealed housing.

9. The fluid processing device of claim 6, wherein the supersonic compressor and the centrifugal compressor are enclosed in a unitary hermetically-sealed or non-hermetically sealed housing.

10. The fluid processing device of claim 6, wherein the supersonic compressor and the centrifugal compressor are each enclosed in a separate hermetically-sealed or non-hermetically sealed housing.

11. The fluid processing device of claim 6, wherein the supersonic compressor, the centrifugal compressor, and the first driver are enclosed in a unitary hermetically-sealed or non-hermetically sealed housing.

12. The fluid processing device of claim 6, wherein the supersonic compressor, the centrifugal compressor, and the first driver are each enclosed in a separate hermetically-sealed or non-hermetically sealed housing.

13. The fluid processing device of claim 1, wherein the separator and the supersonic compressor are enclosed in a unitary hermetically-sealed or non-hermetically sealed housing.

14. The fluid processing device of claim 1, wherein the separator and the supersonic compressor are each enclosed in a separate hermetically-sealed or non-hermetically sealed housing.

15. The fluid processing device of claim 1, wherein the separator is one of a rotary separator, a static separator, and an integrated rotary and static separator.

16. A method for processing multiphase fluid, the method comprising:
   separating at least one higher-density component and at least one lower-density component of the multiphase fluid using a separator;
   providing the separated at least one lower-density component to a supersonic compressor fluidly communicating with the separator; and
   compressing the at least one lower-density component to increase a pressure of the at least one lower-density component,
   wherein the separator and the supersonic compressor are installed on a common rotatable shaft.

17. The method of claim 16, further comprising:
   providing the compressed at least one lower-density component to a centrifugal compressor fluidly communicating with the supersonic compressor.

18. The method of claim 17, wherein the separator, the supersonic compressor, and the centrifugal compressor are installed on the common rotatable shaft.

19. The method of claim 17, wherein the separator, the supersonic compressor, and the centrifugal compressor are enclosed in a unitary hermetically-sealed or non-hermetically sealed housing.

20. The method of claim 17, wherein the separator, the supersonic compressor, and the centrifugal compressor are each enclosed in a separate hermetically-sealed or non-hermetically sealed housing.

21. The method of claim 17, wherein the supersonic compressor and the centrifugal compressor are enclosed in a unitary hermetically-sealed or non-hermetically sealed housing.

22. The method of claim 17, wherein the supersonic compressor and the centrifugal compressor are each enclosed in a separate hermetically-sealed or non-hermetically sealed housing.

23. The method of claim 16, wherein the separator and supersonic compressor are enclosed in a unitary hermetically-sealed or non-hermetically sealed housing.

24. The method of claim 16, wherein the separator and supersonic compressor are each enclosed in a separate hermetically-sealed or non-hermetically sealed housing.

25. The method of claim 16, wherein the separator is one of a rotary separator, a static separator, and an integrated rotary and static separator.

* * * * *